(12) United States Patent
Bullen

(10) Patent No.: US 7,188,506 B2
(45) Date of Patent: Mar. 13, 2007

(54) APPARATUS AND METHOD UTILIZING AN AUTOMATED MACHINE TOOL SYSTEM AND MANDREL FOR COLD WORKING OF HOLES IN METAL COMPONENTS

(75) Inventor: George Nicholas Bullen, Oxnard, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 317 days.

(21) Appl. No.: 10/828,940

(22) Filed: Apr. 21, 2004

(65) Prior Publication Data

US 2005/0235729 A1 Oct. 27, 2005

(51) Int. Cl.
*B21D 53/26* (2006.01)
*B21J 15/02* (2006.01)
*B21P 11/00* (2006.01)

(52) U.S. Cl. ............................ 72/327; 72/336; 72/447; 29/234.54; 29/895.212

(58) Field of Classification Search ................ 72/327, 72/355, 37, 336, 447; 29/243.54, 26 A, 895.212
See application file for complete search history.

(56) References Cited

U.S. PATENT DOCUMENTS

| | | | |
|---|---|---|---|
| 3,434,327 A | * | 3/1969 | Speakman ................... 72/377 |
| 4,583,388 A | | 4/1986 | Hogenhout |
| 4,597,282 A | | 7/1986 | Hogenhout |
| 4,640,114 A | | 2/1987 | Kuless |
| 4,665,732 A | | 5/1987 | Hogenhout |
| 4,819,472 A | * | 4/1989 | Daudi ......................... 72/327 |
| 4,869,091 A | | 9/1989 | Shemeta |
| 4,885,836 A | * | 12/1989 | Bonomi et al. .......... 29/243.54 |
| 4,995,148 A | * | 2/1991 | Bonomi et al. ............. 29/26 A |
| 5,312,080 A | * | 5/1994 | Mazur et al. ............... 248/300 |
| 5,577,315 A | * | 11/1996 | Givler ...................... 29/243.54 |
| 5,613,395 A | | 3/1997 | Zienkiewicz et al. |
| 5,619,781 A | | 4/1997 | Ffield et al. |
| 5,664,311 A | | 9/1997 | Banks et al. |
| 5,943,898 A | | 8/1999 | Kuo |
| 6,314,630 B1 | | 11/2001 | Munk et al. |

FOREIGN PATENT DOCUMENTS

EP 0 182 445 A2 5/1986

* cited by examiner

*Primary Examiner*—David Jones
(74) *Attorney, Agent, or Firm*—Alan G. Towner, Esq.; Pietragallo, Bosick & Gordon LLP

(57) ABSTRACT

A system for automatically cold working holes in metal components is disclosed. An automated mandrel moves in relation to a workpiece in order to perform cold expansion of holes in the workpiece. The mandrel is aligned with the axis of each hole and the surface of the workpiece adjacent to the hole. The system may be used to cold work holes in aircraft components, such as wings and fuselage skins.

35 Claims, 6 Drawing Sheets

APPARATUS AND METHOD UTILIZING AN AUTOMATED MACHINE TOOL SYSTEM AND MANDREL FOR COLD WORKING OF HOLES IN METAL COMPONENTS

FIELD OF THE INVENTION

The present invention relates to cold working of holes in metal components, and more particularly relates to the cold working of holes in aircraft components with an automated machine tool system and mandrel that moves in relation to a workpiece in order to perform cold expansion of holes in the workpiece.

BACKGROUND INFORMATION

In order to strengthen holes in metal aerospace structures such as wing skins, spars and ribs, the holes are cold worked. The cold working or expansion of a hole in a metal component creates a compressive stress zone around the hole that causes a slight increase in hardness and improves fatigue resistance of the material. Conventional cold working techniques include manual procedures and automated processes. Automated methods have utilized stationary cold working mandrels and movable workpieces. However, such methods have several disadvantages, including the requirement of moving relatively large workpieces in relation to stationary mandrels.

An approach to address these problems would be to provide a movable mandrel and a stationary workpiece. However, the use of a movable mandrel raises several issues such as misalignment between the mandrel and the workpiece. For curved workpieces, such as aluminum wing skins, exact alignment of the mandrel with the axis or vector of the hole is difficult. Also, the mandrel head must be flush with the surface of the workpiece, otherwise the mandrel may be pulled toward the workpiece and broken during the cold working operation.

The present invention has been developed in view of the foregoing and to address other deficiencies of the prior art.

SUMMARY OF THE INVENTION

The present invention provides a method and apparatus for automatically cold working holes in metal components such as aircraft wings and fuselages. An automated mandrel moves in relation to the workpiece in order to perform cold expansion of holes in the workpiece. The mandrel is aligned with the axis of each hole to be cold worked. In addition, the mandrel is seated flush against the surface of the workpiece adjacent to the hole. After the mandrel is aligned with the hole in such a manner, the hole is cold worked by the mandrel, followed by removal of the mandrel and alignment with the next hole to be cold worked. A machine tool such as a drill and/or countersink may be provided at an offset distance from the mandrel for sequentially machining a hole, then cold working the hole.

An aspect of the present invention is to provide an automatic cold working system comprising a machine tool for machining holes in a workpiece, a cold working mandrel assembly movable in relation to the workpiece, and means for automatically aligning a mandrel of the mandrel assembly with the holes of the workpiece and a surface of the workpiece.

Another aspect of the present invention is to provide a method of automatically cold working holes in a workpiece. The method includes the steps of moving a mandrel assembly in relation to the workpiece, automatically aligning a mandrel of the mandrel assembly with at least one of the holes of the workpiece and a surface of the workpiece adjacent to the at least one hole, and cold working the at least one hole.

These and other aspects of the present invention will be more apparent from the following description.

DETAILED DESCRIPTION

Figure 1:
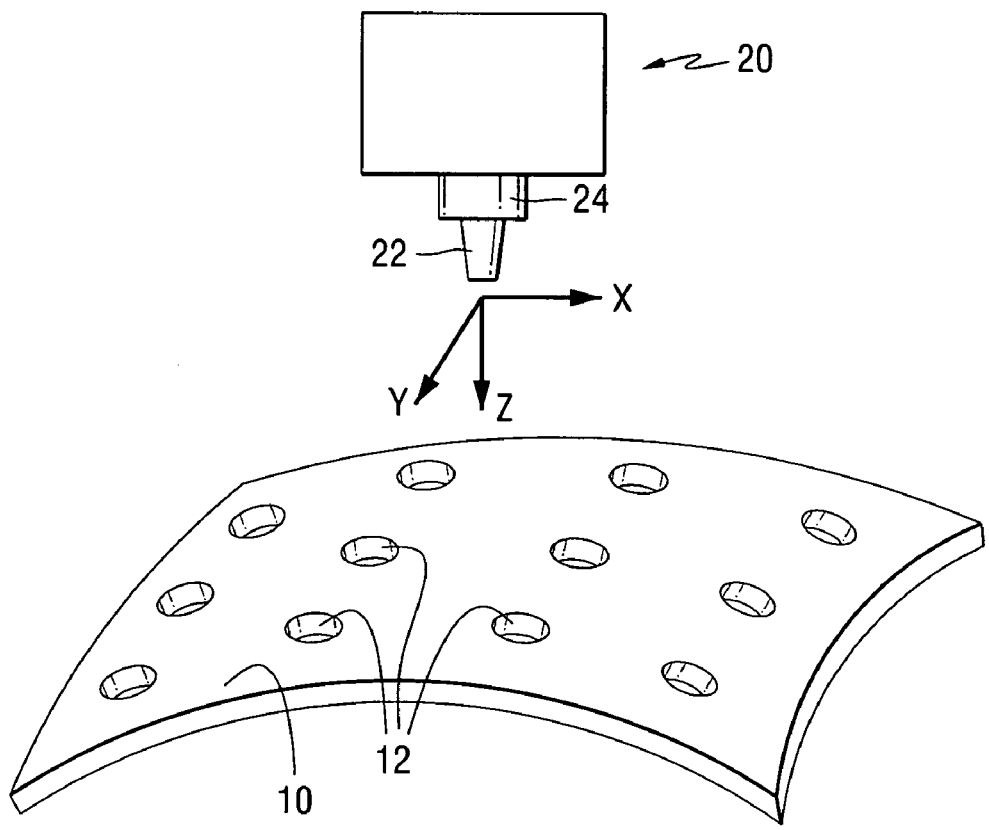
FIG. 1 is a partially schematic side view illustrating a stationary workpiece with holes to be cold worked, and a movable cold working mandrel assembly that may be automatically aligned with the holes of the workpiece in accordance with an embodiment of the present invention.

FIG. 1 schematically illustrates a workpiece 10 including holes 12 to be cold worked. The workpiece 10 may be an aircraft component or any other type of component. In the embodiment shown in FIG. 1, the workpiece 10 is curved. However, any other workpiece shape may be cold worked in accordance with the present invention. An automated cold working mandrel assembly 20 includes a mandrel 22 attached to a base portion 24. The mandrel 22 may be any suitable type of cold working mandrel, such as a split mandrel. As shown by the coordinates x, y and z in FIG. 1, the mandrel assembly 20 is movable in relation to the stationary workpiece 10. Movement of the mandrel assembly 20 may include movement in multiple axes, for example, the mandrel assembly 20 may be mounted on a five-axis head.

Figure 2:
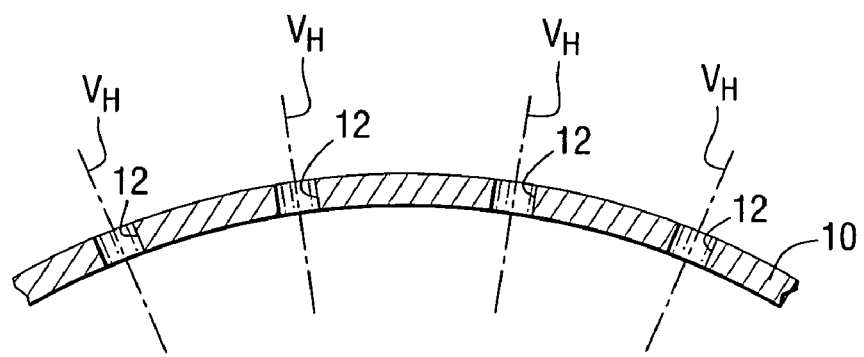
FIG. 2 is a side sectional view illustrating a workpiece with multiple holes having different orientations to be cold worked.

A cross-sectional side view of the workpiece 10 is shown in FIG. 2. Each hole 12 extending through the workpiece 10 has a hole vector $V_H$ defined by an axis extending through the center of the hole. In the embodiment shown in FIG. 2, the hole vectors $V_H$ are oriented in different directions for each hole 12.

Figure 3:
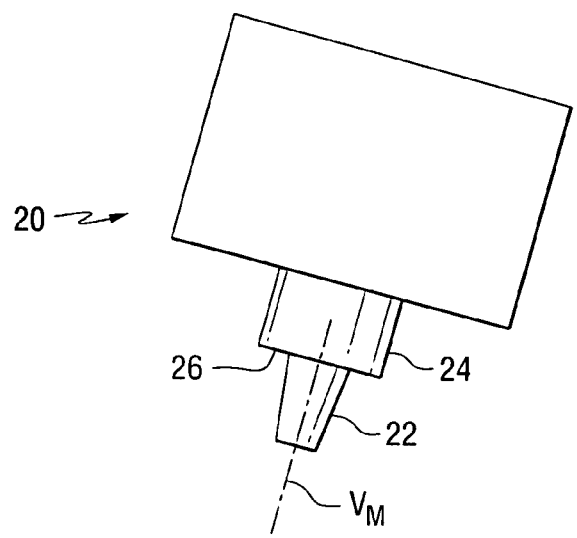
FIG. 3 is a partially schematic side sectional view illustrating the alignment of a hole of a workpiece with a cold working mandrel in accordance with an embodiment of the present invention.
Figure 3:
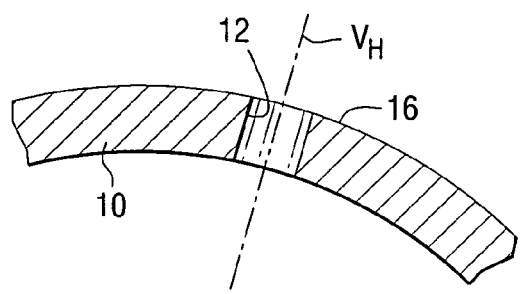

FIG. 3 illustrates the alignment of a hole vector $V_H$ of the workpiece 10 with a mandrel vector $V_M$ of the cold working mandrel 22 in accordance with an embodiment of the present invention. The mandrel vector $V_M$ is defined by an axis extending longitudinally through the center of the mandrel 22. As shown in FIG. 3, the mandrel assembly 20 includes a base 24 attached to the mandrel 22. The base 24 has a surface 26 which, in accordance with the present invention, is aligned such that it lies substantially flush against the surface 16 of the workpiece 10 adjacent to the hole 12 before the hole 12 is cold worked.

Figure 4:
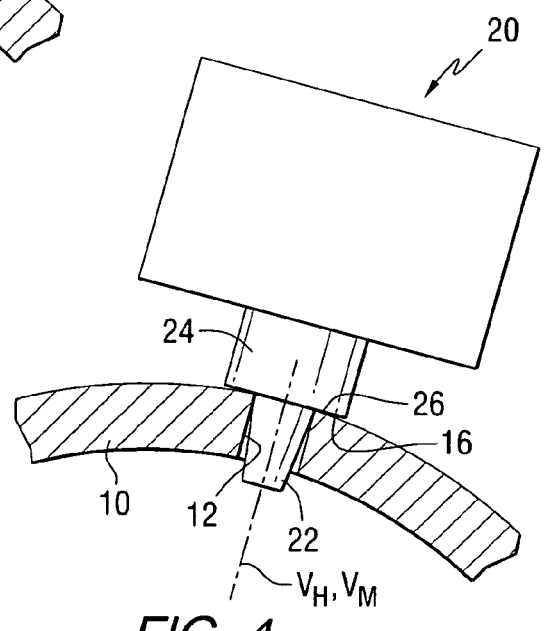
FIG. 4 is a partially schematic side sectional view illustrating a mandrel assembly including a mandrel and a base portion. The mandrel is inserted a hole of a workpiece, and the base portion of the mandrel is aligned flush with the surface of the workpiece adjacent to the hole.

FIG. 4 schematically illustrates the mandrel 22 inserted in the hole 12 of the workpiece 10, with the surface 26 of the base portion 24 aligned flush with the surface 16 of the workpiece 10 adjacent to the hole 12. Once the hole and mandrel vectors $V_H$, $V_M$ are aligned, and once the surface 26 of the mandrel assembly 20 is seated flush against the surface 16 of the workpiece 10 as shown in FIG. 4, the mandrel 22 is radially expanded to thereby cold work the surrounding hole.

Figure 5:
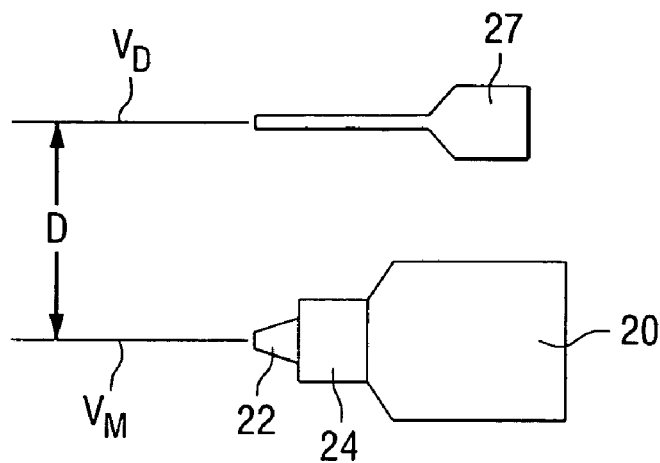
FIG. 5 is a side view of an automatic cold working system including a machine tool and a mandrel aligned at an offset distance with respect to each other in accordance with an embodiment of the present invention.

FIG. 5 illustrates an automatic cold working system including a machine tool 27 and mandrel 22 aligned at an offset distance D with respect to each other in accordance with an embodiment of the present invention. The machine tool 27, such as a drill and/or countersink, has a vector $V_D$ defined by the longitudinal axis of the machine tool 27. The offset distance D is measured between the machine tool vector $V_D$ and the mandrel vector $V_M$, which are preferably oriented in the same direction. The offset distance D may be any suitable distance, typically from about 4 to about 10 inches, for example, about 7 inches. Alignment of the mandrel 22 with the hole 12 of the workpiece 10 is made possible by the precise and known positioning D between the machine tool 27 and mandrel 22. The calculation of the value of the previously drilled hole using the distance D from the centerline of the drill $V_D$ to the center line of the mandrel $V_M$ with the alignment of the automated cold work mandrel along the linear axis of the drill/countersink may be used by a controller to position the mandrel 22 precisely in front of and aligned with the hole 12.

Figure 6:
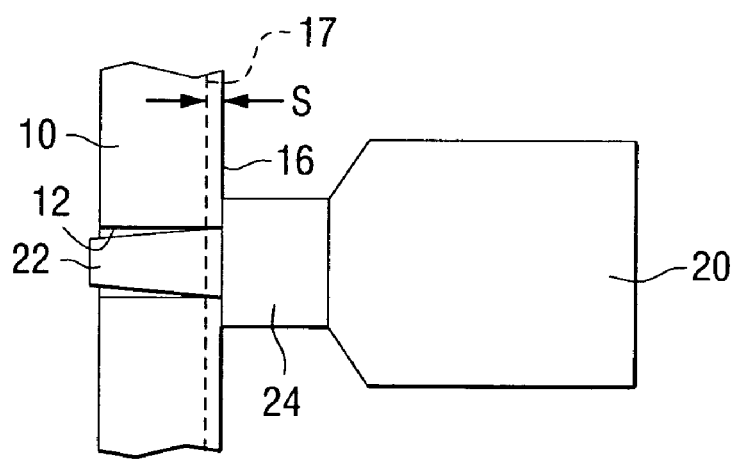
FIG. 6 is a side view illustrating an extended stop position of a mandrel beyond the determined distance between the base of the mandrel and the surface of the workpiece for ensuring flush positioning of the mandrel against the surface of the workpiece in accordance with an embodiment of the present invention.
Figure 7:
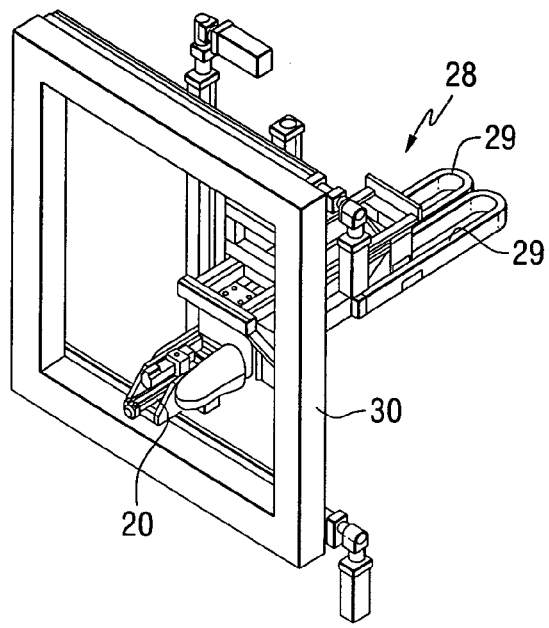
FIG. 7 is an isometric view of an automatic cold working system in accordance with an embodiment of the present invention.
Figure 9:
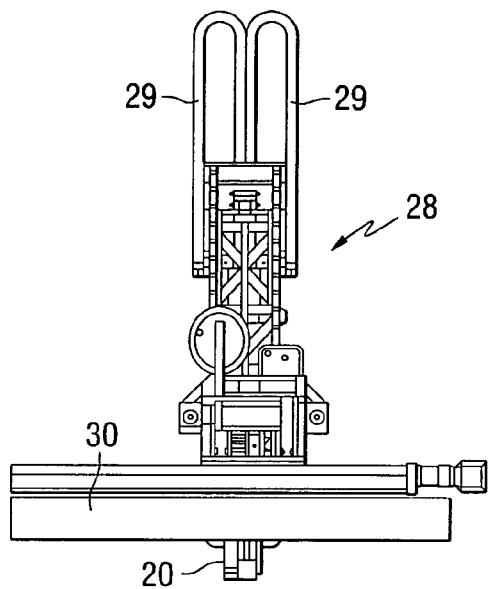
FIG. 9 is a top view of the automatic cold working system of FIG. 7.
Figure 8:
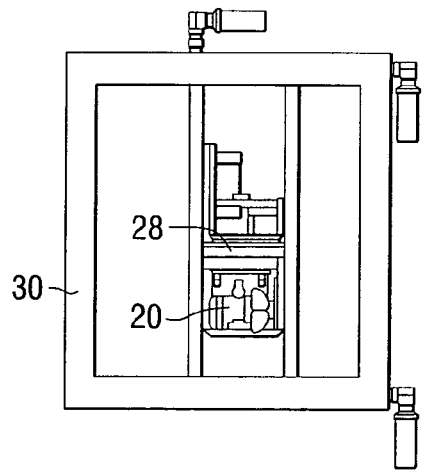
FIG. 8 is a front view of the automatic cold working system of FIG. 7.
Figure 10:
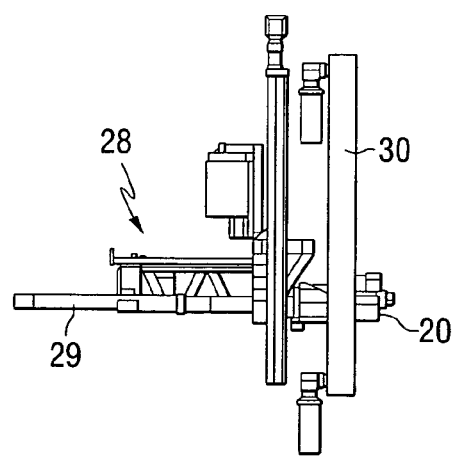
FIG. 10 is a side view of the automatic cold working system of FIG. 7.

FIG. 6 illustrates an extended stop position of a mandrel assembly 20 beyond the determined distance between the base 24 of the mandrel 22 and the surface 16 of the workpiece 10 for ensuring flush positioning of the mandrel against the surface of the workpiece in accordance with an embodiment of the present invention. When the mandrel assembly 20 is advanced against the surface 16 of the workpiece 10 adjacent to the hole 12, a stop position an extended distance S beyond the surface 16 is established. The extended distance S represents a distance beyond the location that the base 24 of the mandrel assembly 20 contacts the surface 16 of the workpiece when the mandrel 22 is inserted in the hole 12. The extended distance S is typically from about 0.05 to about 0.1 inch, for example, about 0.075 inch. Flushness of the base 24 of the mandrel against the surface 16 of the workpiece is achieved by the coordination of the linear line of motion of the machine tool 27 that created the hole 12, the position of the surface 16 of the workpiece 10 and the mandrel pressure point. The machine controller may command a cylinder to move against a stop that is mechanically positioned to stop the motion of the mandrel 22, e.g., 0.075 inch further than the intersect point of the base 24 of the mandrel and the surface 16 of the workpiece. The hole position that was previously drilled has a known position that is incorporated into the calculations for positioning the mandrel aligned with and flush to the surface of the workpiece.

FIGS. 7–10 further illustrate an automatic cold working system in accordance with an embodiment of the present invention. The mandrel assembly 20 is mounted on a controller 28 comprising two parallel linear guide rails 29. The guide rails 29 provide linear directional control for the mandrel assembly 20 as it moves along a parallel path with the machine tool vector or centerline $V_D$. In addition, the rails 29 are aligned and the cold work mandrel assembly 20 is affixed so the centerline of the machine tool $V_D$ and the centerline of the mandrel $V_M$ are aligned along their respective axis of motion.

The mandrel assembly 20 extends through a frame 30 containing alignment holes that may be used to affix the automated machine to a variety of assembly tools, which in turn hold the workpiece. The locating holes of the frame may be installed to precise dimensions that, when affixed to the assembly tool, provide coordination values between the frame 30, the assembly tool and the workpiece. Therefore, the automated machine that carries the automated cold working mandrel 20 can be moved from assembly tool to assembly tool rapidly due to the rapid alignment and positioning provided by the coordinating holes.

Figure 11:
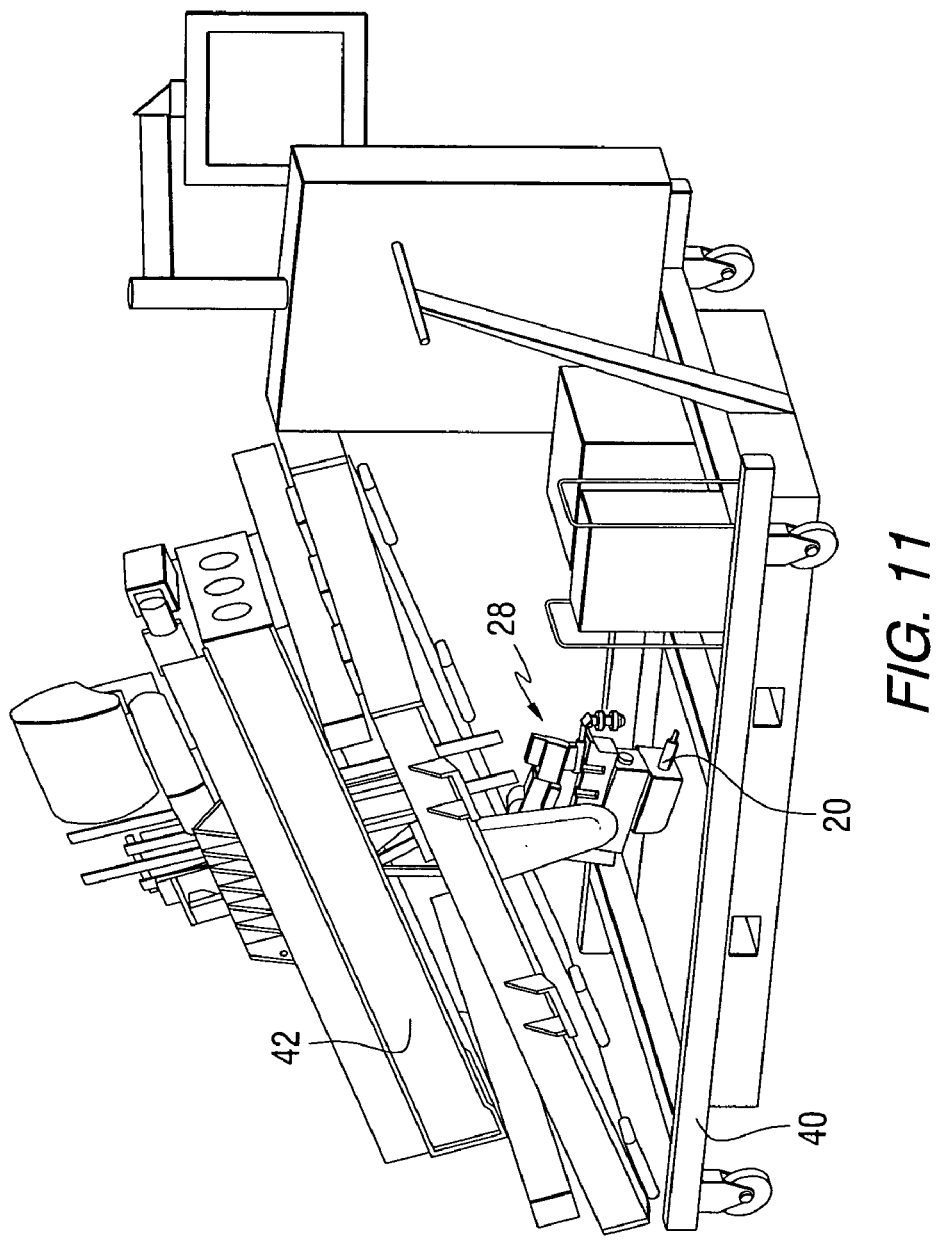
FIG. 11 illustrates a support structure for an automatic cold working system in accordance with an embodiment of the present invention.

FIG. 11 illustrates a support structure for an automatic cold working system in accordance with an embodiment of the present invention. The controller 28 and associated mandrel assembly 20 are mounted on a support structure including a base support 40 and an upper support 42. The base support 40 may be a transport structure that provides the transport media for the automated drill/countersink and cold working machine. The machine can be moved about the factory to various manufacturing centers for application on a variety of assembly tools holding different aircraft workpiece assemblies. The method of locomotion for the transport media may be air bearings that when activated lift the machine and its transport and allows ease of movement throughout the factory. The automated machine may be lifted from its holding/transport media by means of a crane.

Figure 12:
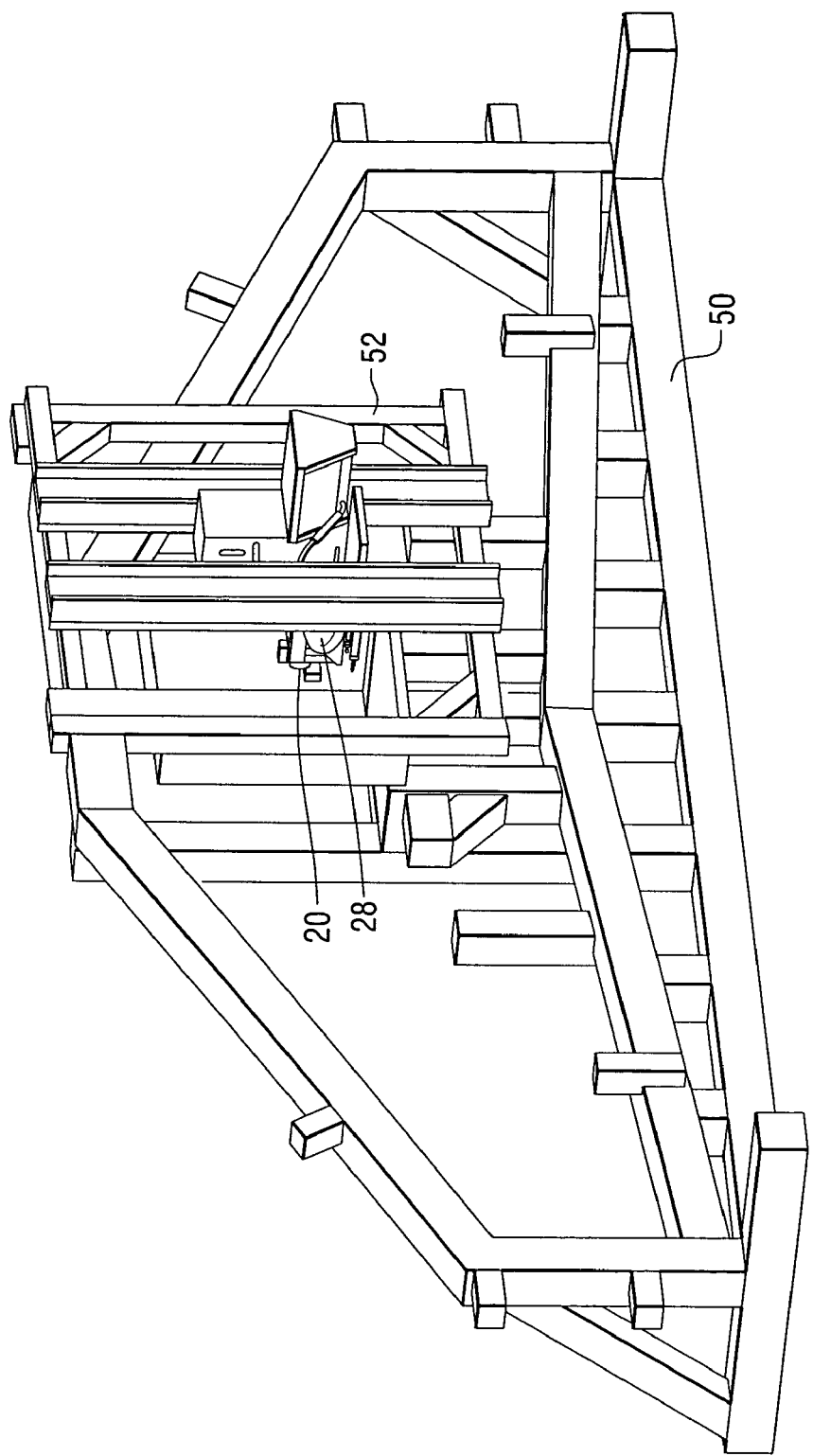
FIG. 12 illustrates a support structure for an automatic cold working system in accordance with another embodiment of the present invention.

FIG. 12 illustrates a support structure for an automatic cold working system in accordance with another embodiment of the present invention. The controller 28 and associated mandrel assembly 20 are mounted on a support structure including a base 50 and upper support member 52. The base 50 may be a typical aircraft assembly tool that facilitates the holding of the workpiece in precise position for application of drilling/countersink/cold working process in anticipation of fastening. The assembly tool also supports and contains the matching holes that aligns, holds and positions the support member 52 while the operations of drill/countersink/cold work are performed by the automated system. The machine may be affixed the assembly tool by precision pins which are pushed through the holes of the automated system into matching holes in the assembly tool.

The automated cold working system of the present invention operates as follows. The mandrel 20 is automatically aligned with each hole 12 in the following manner. The vector and normal are aligned with the hole by way of the mandrel being aligned and affixed directly under the drill/countersink end effector a known and precise distance and traveling along a parallel path. The motion of the mandrel may be made by activating an electro pneumatic cylinder that thrusts the mandrel forward against a stop which is positioned beyond the workpiece impact point the so the pressure point of the mandrel gently impacts the surface of the workpiece and compresses it. A standard computer command may then activate the mandrel process and when complete may send a clear signal to the computer. After the clear signal is received indicating that the cold work operation is complete, the computer may deactivate the electric pneumatic cylinder and it retracts back to its safe position.

The following examples are intended to illustrate various aspects of the present invention, and are not intended to limit the scope of the invention.

EXAMPLE 1

A metallurgical examination of a test article containing several cold expanded holes drilled in an aluminum/aluminum and an aluminum/steel assembly was conducted. The assembly, complete with a wing skin with a trunnion or landing gear rib and a tip rib, was designed to represent a miniature T-38 aircraft wing and was used to determine the feasibility of cold expanding or cold working of holes drilled in T-38 wings using automated machinery incorporating a split mandrel.

The text assembly consisted of a landing gear rib, approximately 0.281 inch thick, made of Hy-Tuf low alloy steel heated treated to 220–240 KIS, a 7075-T73 aluminum wing skin, 0.250 inch thick, and the rest of the structure, including spars and ribs also made of 7075-T73 aluminum alloy. The assembly was subsequently mounted on an automated drilling machine that was adapted to incorporate a West Coast Industries hydraulically operated split mandrel tool. Typical holes representing various nominal sizes of 5/32, 3/16, and 1/4-inch were drilled, cold expanded and reamed. Interferences with the substructure and a machined step on the surface of the wing skin had prevented the operating personnel from cold expanding all the holes drilled.

There were 139 holes targeted for the demonstration to be cold expanded using automation technology per the FH-114 standard. The machine used for the demonstration and test was adapted for the cold working head and tool, and was mounted beneath an existing drill head. The cold working tool was permanently mounted and aligned on centerline with the drill head. Of the 139 holes that were attempted, 6 of 28 of the PLT114-8 holes were cold worked. Twenty-one of the remaining PLT114-8 holes were in thick steel structure that could not be cold expanded using the split mandrel. The only PLT114-8 hole in aluminum that could not be cold expanded occurred on a flange in the substructure where the hole exited into the radius.

All ninety-nine of the PLT114-6 holes in aluminum were completed per specification. Three of the twelve PLT114-5 holes in aluminum were cold worked. Three of the remaining PLT114-5 holes were next to a machined relief area on the skin. The face of the cold working tool was positioned half on and half off the rise and would have bent or broken the cold working mandrel had we proceeded. Six of the remaining PLT114-5 holes occurred in an area where, had the mandrel been inserted into the hole the necessary depth it would have struck the opposite side of the structure and broken the mandrel. All of the holes that were successfully cold expanded/worked and reamed met all three hole dimensional criteria described in the specification except for PLT114-5 at each stage of the cold working process.

The entire assembly was visually examined then disassembled for a metallurgical examination. The visual examination revealed a misalignment of the wing skin on the tip rib, thus causing many holes to fail to meet the minimum edge distance requirement of 1.75 inches. However, other than one hole that was slightly mis-drilled, possibly as the result of the start up process, the rest were properly drilled and no cracks or other injurious defects were found in the holes examined.

Two typical holes, namely one 1/4-inch hole located in the all-aluminum structure and one 1/4-inch hole in the aluminum/steel combination structure, were selected for metallurgical examination. They were subsequently excised from the assembly, mounted on bakelite, polished, and etched with Keller's or Nital etchant, as required, for a macro and micro-examination. The hole going through the steel structure was not reamed due top mandrel breakage. Again no cracks or objectionable defects were found on the ID surfaces or in the vicinity of the holes.

In order to determine the thickness of the compression zone, typical hardness surveys were made on two holes using Knoop micro-hardness with 200-gram and 500-gram loads on the aluminum and the Hy-Tuf steel, respectively. One hole was located in the steel rib and the other hole in the 1/8-inch thick aluminum substructure. The hardness surveys showed that the readings decreased slightly at the edge of the hole, probably due to edge effect, then increased gradually to form a compressive stress zone as thick as one diameter of the hole when the hardness dropped down to equal that of the base metal. The low and narrow ridges caused by the split mandrel on the ID surface of the holes formed a very gentle contour and therefore, did not produce any stress corrosion prone end grain effect as previously assumed.

EXAMPLE 2

Automated cold working was performed on a full-scale T-38 wing. The West Coast Industries cold working tool that was used in Example 1 was used as a design base for the end effect or for the automated drilling system. The tool was mounted on center and under the drill spindle of a standard Northrop/AIM GADS five-axis head. The tool is affixed to the underside of the spindle mount by ball rail and bearings, as shown in FIGS. 7–10. The head travels out and retracts along the centerline on the ball rails. Subsequent to drilling the pre-cold work hole, the cold working tool is moved into position. The mandrel assembly is moved into the hole by a pneumatic cylinder. A standard computer code activates a hydraulic pack that pulls the mandrel through the hole and expands the metal. The mandrel then returns to its previous position and is retracted from the hole. The application of the present system reduces the incidence of broken mandrels compared with hand application methods, thereby reducing production delays and costs. For example, the incidence of broken mandrels may be reduced by at least ten-fold using the automated system of cold work of the present invention.

Whereas particular embodiments of this invention have been described above for purposes of illustration, it will be evident to those skilled in the art that numerous variations of the details of the present invention may be made without departing from the invention as defined in the appended claims.

What is claimed is:

1. An automatic cold working system comprising:
   a machine tool for machining holes in a workpiece;
   a cold working mandrel assembly movable in relation to the workpiece; and means for automatically aligning a mandrel of the mandrel assembly with the holes of the workpiece and a surface of the workpiece and cold working the holes to create compressive stress zones around the holes.

2. The automatic cold working system of claim 1, wherein each hole of the workpiece has a hole vector defined by an axis extending through a center of the hole, the mandrel has a mandrel vector defined by an axis extending longitudinally through a center of the mandrel, and the alignment means aligns the hole vector and the mandrel vector.

3. The automatic cold working system of claim 2, wherein the hole vectors are oriented in different directions.

4. The automatic cold working system of claim 1, wherein the mandrel assembly comprises a base attached to the mandrel, and the alignment means aligns a surface of the base substantially flush with the surface of the workpiece adjacent to a hole of the workpiece to be cold worked.

5. The automatic cold working system of claim 1, wherein the machine tool comprises a drill.

6. The automatic cold working system of claim 5, wherein the drill and the mandrel are arranged at an offset distance from each other, the mandrel has a mandrel vector defined by an axis extending longitudinally through a center of the mandrel, the drill has a drill vector defined by an axis extending longitudinally along the length of the drill, and the mandrel vector and drill vector are oriented in substantially the same direction.

7. The automatic cold working system of claim 6, wherein the offset distance is from about 4 to about 10 inches.

8. The automatic cold working system of claim 1, wherein the aligning means aligns the mandrel assembly against the surface of the workpiece by providing a stop position of the mandrel at an extended distance beyond a first distance at which the base of the mandrel initially contacts the surface of the workpiece.

9. The automatic cold working system of claim 8, wherein the extended distance is from about 0.05 to about 0.1 inch.

10. The automatic cold working system of claim 8, wherein the extended distance is about 0.075 inch.

11. The automatic cold working system of claim 1, wherein the mandrel assembly is mounted on a five-axis head.

12. The automatic cold working system of claim 1, wherein the mandrel is a split mandrel.

13. The automatic cold working system of claim 1, wherein the machine tool and the cold working mandrel assembly are movable and the workpiece is stationary during the cold working operations.

14. The automatic cold working system of claim 1, wherein the alignment means is mounted on a transportable support structure.

15. The automatic cold working system of claim 1, wherein the surface of the workpiece is curved.

16. The automatic cold working system of claim 1, wherein the workpiece comprises an aircraft component.

17. A method of automatically cold working holes in a workpiece, the method comprising:
moving a mandrel assembly in relation to the workpiece;
automatically aligning a mandrel of the mandrel assembly with at least one of the holes of the workpiece and a surface of the workpiece adjacent to the at least one hole; and
cold working the at least one hole to form a compressive stress zone around the at least one hole.

18. The method of claim 17, wherein each hole of the workpiece has a hole vector defined by an axis extending through a center of the hole, the mandrel has a mandrel vector defined by an axis extending longitudinally through a center of the mandrel, and the hole vector is aligned with the mandrel vector.

19. The method of claim 18, wherein the hole vectors are oriented in different directions.

20. The method of claim 17, wherein the mandrel assembly comprises a base attached to the mandrel, and a surface of the base is aligned substantially flush with the surface of the workpiece adjacent to a hole of the workpiece to be cold worked.

21. The method of claim 17, further comprising providing a machine tool arranged at an offset distance from the mandrel for machining the holes in the workpiece.

22. The method of claim 21, wherein the machine tool comprises a drill.

23. The method of claim 22, wherein the drill and the mandrel are arranged at an offset distance from each other, the mandrel has a mandrel vector defined by an axis extending longitudinally through a center of the mandrel, the drill has a drill vector defined by an axis extending longitudinally along the length of the drill, and the mandrel vector and drill vector are oriented in substantially the same direction.

24. The method of claim 23, wherein the offset distance is from about 4 to about 10 inches.

25. The method of claim 17, wherein the mandrel assembly is aligned against the surface of the workpiece by providing a stop position of the mandrel at an extended distance beyond a first distance at which the base of the mandrel initially contacts the surface of the workpiece.

26. The method of claim 25, wherein the extended distance is from about 0.05 to about 0.1 inch.

27. The method of claim 25, wherein the extended distance is about 0.075 inch.

28. The method of claim 17, wherein the mandrel assembly is movable in at least five axes.

29. The method of claim 17, wherein the mandrel is a split mandrel.

30. The method of claim 17, wherein the surface of the workpiece is curved.

31. The method of claim 17, wherein the workpiece comprises an aircraft component.

32. An automatic cold working system comprising:
a machine tool for machining holes in a workpiece;
a cold working mandrel assembly movable in relation to the workpiece; and
means for automatically aligning a mandrel of the mandrel assembly with the holes of the workpiece and a surface of the workpiece,
wherein the machine tool and the mandrel are arranged at an offset distance from each other, the mandrel has a mandrel vector defined by an axis extending longitudinally through a center of the mandrel, the machine tool has a machine tool vector defined by an axis extending longitudinally along a length of the machine tool, and the mandrel vector and machine tool vector are oriented in substantially the same direction.

33. An automatic cold working system comprising:
a machine tool for machining holes in a workpiece;
a cold working mandrel assembly movable in relation to the workpiece; and
means for automatically aligning a mandrel of the mandrel assembly with the holes of the workpiece and a surface of the workpiece,
wherein the aligning means aligns the mandrel assembly against the surface of the workpiece by providing a stop position of the mandrel at an extended distance of from about 0.05 to about 0.1 inch beyond a first distance at which the base of the mandrel initially contacts the surface of the workpiece.

34. An automatic cold working system comprising:

a machine tool for machining holes in a workpiece;

a cold working split mandrel assembly movable in relation to the workpiece; and means for automatically aligning a mandrel of the mandrel assembly with the holes of the workpiece and a surface of the workpiece.

35. A method of automatically cold working holes in a workpiece, the method comprising:

moving a mandrel assembly in relation to the workpiece;

automatically aligning a mandrel of the mandrel assembly with at least one of the holes of the workpiece and a surface of the workpiece adjacent to the at least one hole;

cold working the at least one hole; and providing a machine tool arranged at an offset distance from the mandrel for machining the holes in the workpiece.

* * * * *